(12) United States Patent
Hasegawa et al.

(10) Patent No.: US 7,931,400 B2
(45) Date of Patent: Apr. 26, 2011

(54) TEMPERATURE SENSOR AND RELATED REMOTE TEMPERATURE SENSING METHOD

(75) Inventors: Ryusuke Hasegawa, Morristown, NJ (US); Daichi Azuma, Myrtle Beach, SC (US)

(73) Assignee: Metglas, Inc., Conway, SC (US)

( * ) Notice: Subject to any disclaimer, the term of this patent is extended or adjusted under 35 U.S.C. 154(b) by 271 days.

(21) Appl. No.: 11/712,444

(22) Filed: Mar. 1, 2007

(65) Prior Publication Data

US 2008/0212644 A1 Sep. 4, 2008

(51) Int. Cl.
*G01K 7/00* (2006.01)
(52) U.S. Cl. ........................ 374/176; 374/177
(58) Field of Classification Search .................. 374/176, 374/177
See application file for complete search history.

(56) References Cited

U.S. PATENT DOCUMENTS

| | | | |
|---|---|---|---|
| 4,052,696 A | 10/1977 | Enabnit | |
| 4,142,571 A | 3/1979 | Narasimhan | |
| 4,434,411 A | 2/1984 | Anderson, III et al. | |
| 4,533,259 A * | 8/1985 | Wakahara | 374/166 |
| 4,537,517 A | 8/1985 | Inomata et al. | |
| 6,208,253 B1 | 3/2001 | Fletcher et al. | |
| 6,991,045 B2 * | 1/2006 | Vinegar et al. | 175/45 |
| 2005/0229690 A1 | 10/2005 | Kikuchi et al. | |
| 2007/0263699 A1 | 11/2007 | Clothier et al. | |
| 2008/0212646 A1 * | 9/2008 | Azuma et al. | 374/176 |

FOREIGN PATENT DOCUMENTS

| | | | |
|---|---|---|---|
| JP | 55052921 A * | 4/1980 | |
| JP | 58095232 A * | 6/1983 | |

OTHER PUBLICATIONS

Soshin Chikazumi, "Physics of Magnetism", Published by John Wiley & Sons, NY (1964), p. 498 (in English) and title page and chapter page.
International Search Report and Written Opinion of the International Searching Authority, mailed on Aug. 1, 2008 and issued in corresponding International Patent Application No. PCT/US2008/005018.
Final Office Action, in related co-pending U.S. Appl. No. 11/712,449 mailed May 12, 2010.
Non-Final Office Action in related co-pending U.S. Appl. No. 11/712,449 mailed Jan. 27, 2010.
Office Action mailed Aug. 18, 2010 for co-pending U.S. Appl. No. 11/712,449.
Second PCT Written Opinion dated Dec. 23, 2010 for PCT/US08/05018, which is based on this application.
Second PCT Written Opinion dated Dec. 23, 2010 for PCT/US08/05019, which is based on co-pending U.S. Appl. No. 11/712,449.
Final Office Action dated Dec. 20, 2010 of co-pending U.S. Appl. No. 11/712,449.
U.S. Appl. No. 11/712,449, filed Mar. 1, 2007, Remote Temperature Sensing Device and Related Remote Temperature Sensing Method by Daichi Azuma and Rysuke Hasegawa.
Non-Final Office Action dated Sep. 8, 2009 in U.S. Appl. No. 11/712,449.
International Search Report, mailed Aug. 7, 2008 and issued in corresponding International Patent Application No. PCT/US2008/005019.

* cited by examiner

*Primary Examiner* — Lisa M Caputo
*Assistant Examiner* — Mirellys Jagan (57) ABSTRACT

A temperature sensor includes a plurality of rectangular shaped amorphous magnetic alloy strips connected magnetically, wherein at least one of the strips has a predetermined ferromagnetic Curie temperature, and another strip has a magnetic permeability well exceeding 2,000. The temperature sensor may be used in a related remote temperature sensing method wherein the sensor is interrogated by a magnetic field and the temperature sensor's response signal is detected electromagnetically.

20 Claims, 6 Drawing Sheets

TEMPERATURE SENSOR AND RELATED REMOTE TEMPERATURE SENSING METHOD

BACKGROUND OF THE INVENTION

1. Field of the Invention

This application is related to the field of temperature sensing. In particular, this invention is related to a magnetic sensor in which the Curie magnetic transition of an amorphous ferromagnetic material is utilized, and a method of remote temperature sensing using the magnetic sensor.

2. Description of the Related Art

There are a number of techniques and tools available to measure temperature, including a well-known temperature indicator such as classical mercury thermometer, thermocouple, resistance thermometer, bi-metal, and the like. All of these utilize some basic physical phenomena which vary with temperature, thus each having a unique feature. For example, mercury thermometry is effective for visual sensing of temperature, but is not suited for direct conversion of temperature to an electrical signal. A thermocouple which utilizes thermoelectric effects of metals is more suited if an electronic reading of temperature is needed. However, a thermocouple has to be wired to a voltmeter which converts an electrical signal to a corresponding temperature. A resistance thermometer which utilizes the temperature dependence of resistivity of a metal also has to be wired to a voltmeter. These techniques require wire connections between a sensor and a temperature indictor, and therefore, are not suited for remote sensing of temperature. In such cases, as in sensing the temperature of a moving or a physically inaccessible object, remote sensing of temperature becomes necessary. This kind of a sensor must respond to temperature and send a temperature-dependent signal wirelessly to a detector for further signal processing. One such sensor may be realized by utilizing the Curie magnetic transition in a ferromagnetic material. A ferromagnetic material such as iron has a ferromagnetic Curie temperature, above which ferromagnetism disappears along with all related phenomena such as high magnetization and permeability. The change of the magnetization and the permeability of a ferromagnetic material at the Curie temperature may be readily detected remotely by a conventional magnetometry. Using this technique, a temperature-sensitive switch was disclosed in U.S. Pat. No. 4,434,411 (hereinafter, the '411 patent). The '411 patent utilizes the change at the Curie temperature of the magnetic force acting on the magnetic materials attached to a mechanical switch, providing a temperature-sensitive switch which replaces a conventional bimetal-based switch.

A remote temperature sensing capability is increasingly in demand in office, home and industry, in which more electronics are being utilized to control equipment and machinery. One such example is disclosed in U.S. Pat. No. 4,052,696 (hereinafter, the '696 patent), in which the Curie magnetic transition of a ferrite is utilized in a tire temperature monitor. This technique, however, requires a very small gap between the ferrite-based sensor and a stationary detector to maintain a reliable detecting signal. The width of this gap is too small because ferrites usually have relatively low magnetic permeabilities ranging from 80 to 2,000 [see, for example, Table 22-2 on page 498 of "Physics of Magnetism" by S. Chikazumi (John Wiley & Sons, NY, 1964)]. In addition, the availability of different Curie temperatures suited for this kind of temperature sensing from ferrite products is limited to several discrete temperatures ranging from 80° C. to 130° C. as given in Table 22-2 of Chikazumi's book. Furthermore, a selected ferrite with a predetermined magnetic Curie transition temperature is a part of an inductive circuit of the sensor, requiring several separate copper windings, as shown in FIGS. 1 and 2 of the '696 patent. Such electrical circuitry becomes cumbersome and needs to be avoided. A simpler, but more effective remote temperature sensing method is clearly needed.

SUMMARY OF THE INVENTION

The present invention provides a temperature sensor with remote temperature detection capability wherein the temperature sensor is easily fabricated and is usable in office, home and industrial environments.

Generally stated, the sensor is composed of a plurality of amorphous magnetic metal strips which are magnetically connected. Furthermore, these strips are arranged in such a manner that at least one of the strips has a predetermined ferromagnetic Curie temperature which is intended to be detected, and the other strip or strips have a high magnetic permeability. Configurations of a temperature sensor for embodiments of the present invention are provided for various applications, and a method of remote temperature sensing using such a temperature sensor is also provided. Chemical compositions of the amorphous alloy strips suited for a temperature sensor for embodiments of the present invention are provided.

In one embodiment of the present invention, there is provided a temperature sensor that includes a plurality of rectangular shaped amorphous magnetic alloy strips connected magnetically, wherein at least one of the strips has a predetermined ferromagnetic Curie temperature, and another strip has a magnetic permeability well exceeding 2,000. Where desired, the magnetic permeability of the another strip is greater than 6000.

In one embodiment, the at least one of the plurality of rectangular shaped amorphous magnetic alloy strips with the predetermined ferromagnetic Curie temperature has a composition defined essentially by the formula $Fe_a M_b B_c Si_d C_e$, wherein $61 < a < 81$, $0 < b < 15$, $2 \leq c < 25$, $0 < d < 10$ and $0 < e \leq 18$ and $a+b+c+d+e=100$, numbers being in atom percent, up to 50% of Fe content being replaced by Ni and M being selected from Cr, Mo, Nb, Ti, and W.

The another strip of the plurality of rectangular shaped amorphous magnetic alloy strips may have a magnetic permeability well exceeding 2,000, and a composition defined essentially by the formula $Fe_a Ni_b Co_c M_e B_f Si_g C_h$ wherein $3 < a < 80$, $0 < b < 41$, $0 < c < 72$, $0 < e < 4$, with M selected from Cr, Mo, and Mn, $1 < f < 20$, $0 < g < 16$ and $0 < h < 4$, and $a+b+c+e+f+g+h=100$, numbers being in atom percent.

In one embodiment, the temperature sensor has one amorphous magnetic alloy strip with the predetermined ferromagnetic Curie temperature and may have a composition defined essentially by the formula $Fe_a M_b B_c Si_d C_e$, wherein $61 < a < 81$, $0 < b < 15$, $2 \leq c < 25$, $0 < d < 10$ and $0 < e \leq 18$ and $a+b+c+d+e=100$, numbers being in atom percent, up to 50% of Fe content being replaced by Ni and M being selected from Cr, Mo, Nb, Ti, and W and one amorphous magnetic alloy strip having a magnetic permeability well exceeding 2,000, and a composition defined essentially by the formula $Fe_a Ni_b Co_c M_e B_f Si_g C_h$ wherein $3 < a < 80$, $0 < b < 41$, $0 < c < 72$, $0 < e < 4$, with M selected from Cr, Mo, and Mn, $1 < f < 20$, $0 < g < 16$ and $0 < h < 4$, and $a+b+c+e+f+g+h=100$, numbers being in atom percent.

In one embodiment, the temperature sensor may have two amorphous magnetic alloy strips with two different compositions having a magnetic permeability well exceeding 2,000, and a composition defined essentially by the formula $Fe_aNi_bCo_cM_eB_fSi_gC_h$ wherein $3<a<80$, $0<b<41$, $0<c<72$, $0<e<4$, with M selected from Cr, Mo, and Mn, $1<f<20$, $0<g<16$ and $0<h<4$, and $a+b+c+e+f+g+h=100$, numbers being in atom percent.

Where desired, the temperature sensor has one amorphous magnetic alloy strip with the predetermined ferromagnetic Curie temperature and may have a composition defined essentially by the formula $Fe_a M_b B_c Si_d C_e$, wherein $61<a<81$, $0<b<15$, $2\leq c<25$, $0<d<10$ and $0<e\leq 18$ and $a+b+c+d+e=100$, numbers being in atom percent, up to 50% of Fe content being replaced by Ni and M being selected from Cr, Mo, Nb, Ti, and W and two amorphous magnetic alloy strips with a same chemical composition of having a magnetic permeability well exceeding 2,000, and a composition defined essentially by the formula $Fe_aNi_bCo_cM_aB_fSi_gC_h$ wherein $3<a<80$, $0<b<41$, $0<c<72$, $0<e<4$, with M selected from Cr, Mo, and Mn, $1<f<20$, $0<g<16$ and $0<h<4$, and $a+b+c+f+g+h=100$, numbers being in atom percent.

In one embodiment, the temperature sensor has at least one amorphous magnetic alloy strip, wherein the at least one strip has a magnetic permeability well exceeding 2,000 and a composition defined essentially by the formula $Fe_aNi_bCo_cM_eB_fSi_gC_h$ wherein $3<a<80$, $0<b<41$, $0<c<72$, $0<e<4$, with M selected from Cr, Mo, and Mn, $1<f<20$, $0<g<16$ and $0<h<4$, and $a+b+c+e+f+g+h=100$, numbers being in atom percent, and has a plurality of amorphous magnetic alloy strips with different chemical compositions selected from: a composition with the predetermined ferromagnetic Curie temperature has a composition defined essentially by the formula $Fe_a M_b B_c Si_d C_e$, wherein $61<a<81$, $0<b<15$, $2\leq c<25$, $0<d<10$ and $0<e\leq 18$ and $a+b+c+d+e=100$, numbers being in atom percent, up to 50% of Fe content being replaced by Ni and M being selected from Cr, Mo, Nb, Ti, and W and a composition having a magnetic permeability well exceeding 2,000, and a composition defined essentially by the formula $Fe_aNi_bCo_cM_eB_fSi_gC_h$ wherein $3<a<80$, $0<b<41$, $0<c<72$, $0<e<4$, with M selected from Cr, Mo, and Mn, $1<f<20$, $0<g<16$ and $0<h<4$, and $a+b+c+e+f+g+h=100$, numbers being in atom percent.

Where desired, the temperature sensor may be utilized in a remote temperature sensing device, wherein said temperature sensor is interrogated by a magnetic field, and said temperature sensor's response signal is detected electromagnetically.

In one embodiment, the remote temperature sensing device may have at least one coil emanating an interrogating magnetic field and at least one coil detecting a response signal of a temperature sensor, wherein the temperature sensor, comprises a plurality of rectangular shaped amorphous magnetic alloy strips connected magnetically, and wherein at least one of the strips has a predetermined ferromagnetic Curie temperature, and another strip has a magnetic permeability well exceeding 2,000.

Additional aspects and/or advantages of the invention will be set forth in part in the description which follows and, in part, will be apparent from the description, or may be learned by practice of the invention.

BRIEF DESCRIPTION OF THE DRAWINGS

The invention will be more fully understood and further advantages will become apparent when reference is made to the following detailed description of the preferred embodiment of the invention and the accompanying drawings in which.

DETAILED DESCRIPTION OF THE EMBODIMENTS

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 1:
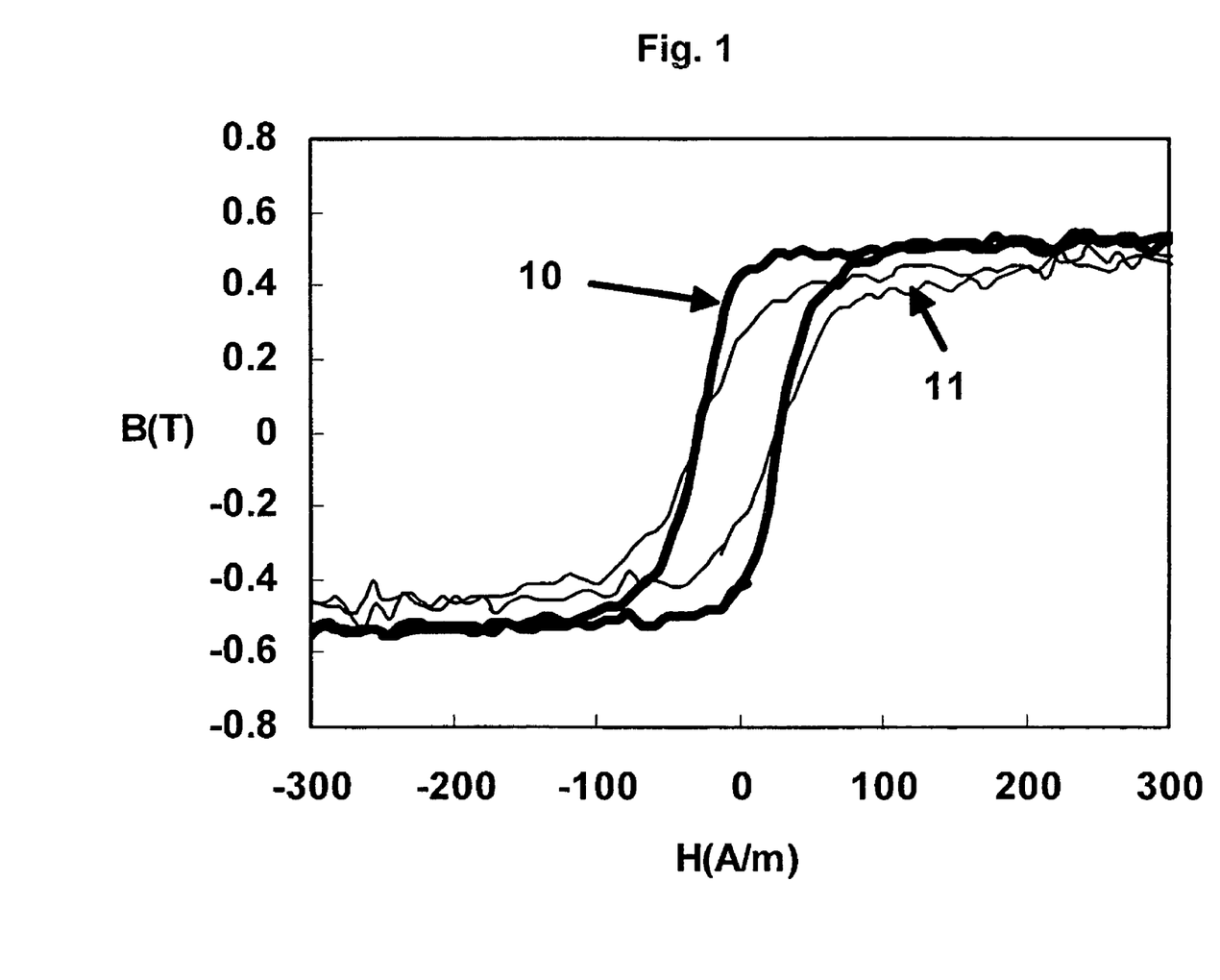
FIG. 1 is a graphical representation of magnetic induction B plotted vs. an applied magnetic field H comparing BH behaviors of two magnetic amorphous metal strips, one with a length of 80 mm, shown by Curve 10 (in bold) and the other with a length of 40 mm, shown by Curve 11, in accordance with embodiments of the present invention.

Amorphous magnetic alloy strips for a temperature sensor according to embodiments of the present invention were prepared by a process outlined in Example 1 (see below). The first operation of embodiments of the present invention is examining basic magnetics of the amorphous alloy strips by a method described in Example 2. Referring to FIG. 1, the magnetic induction B in tesla (T) is plotted as a function of an applied magnetic field H in A/m for amorphous magnetic strips, one with a length of 80 mm, shown by Curve 10, and the other with a length of 40 mm, shown by Curve 11. The amorphous magnetic strips of embodiments of the present invention have a thickness of about 20 µm and widths of about 2 mm and are cut from a commercially available METGLAS®2714A ribbon with a saturation magnetic induction of about 0.6 T and a near-zero magnetostriction. This ribbon shows a square or rectangular BH loop when the strip's length is much longer than 75 mm. Due to the demagnetizing effect which depends on the strip's length-to-width ratio, the BH behaviors shown in FIG. 1 for the two strips having different lengths are different, the shorter strip showing a more sheared BH loop or behavior than the longer one. This difference in the BH behaviors of the amorphous metal strips according to embodiments of the present invention results in a corresponding difference in their higher harmonics generation. The harmonic responses of the amorphous magnetic alloy strips according to embodiments of the present invention are characterized by a method described in Example 3. Generally, a magnetic thin strip with a square or rectangular BH behavior generates higher harmonics of the fundamental frequency at which the strip is magnetically excited. The amplitude and the higher harmonics spectrum of the emanating magnetic field from the magnetic strip depends on the degree of the non-linearity of the BH behavior. The degree of the non-linearity of a given magnetic strip depends on the length-to-width ratio of the strip. Examples of this relationship are given in Table I for different amorphous magnetic alloys with different ferromagnetic Curie temperatures $\theta_f$. Alloys, AM1 through AM4, in Table I are based on amorphous magnetic Fe-M-B—Si—C, in which the Fe content ranges from 61 to 81 atom percent, of which up to 50% of Fe may be replaced by Ni, M is selected from Cr, Mo, Nb, Ti and W, and ranges from 0 to 15 atom percent, B content ranges from 2 to 25 atom percent, and Si content ranges from 0 to 10 atom percent and C content from 0 to 18 atom percent. More examples of the amorphous alloys with the similar function are given in Table III.

TABLE I

Harmonics Generation of Magnetic Amorphous Metal Strips
(Data taken by the method described in Example 3 with a
fundamental excitation frequency of 2.4 kHz)

| ALLOY | $\theta_f$, Curie Temperature (° C.) | 25$^{th}$ Harmonic Signal (mV) | | |
|---|---|---|---|---|
| | | l = 40 mm | l = 75 mm | l = 110 mm |
| AM1 ($Fe_{62}Cr_{14}B_{18}Si_5$) | 93 | 17 | 140 | 355 |
| AM2 ($Fe_{66.5}Cr_{13}B_{18}Si_{2.5}$) | 99 | 23 | 258 | 359 |
| AM3 ($Fe_{67}Mo_7B_{20}Si_6$) | 222 | 11 | 49 | 173 |
| AM4 ($Fe_{71}Mo_6B_{20}Si_3$) | 213 | 17 | 143 | 343 |
| METGLAS ® 2705M | 350 | 35 | 323 | 1230 |
| METGLAS ® 2714A | 230 | 28 | 520 | 1590 |

As Table I indicates, the harmonic signals are not linearly proportional with respect to the strip length, l. This is mainly due to the demagnetizing effect mentioned above, and the magnetic volume difference is secondary in the order of contributing factors to the harmonic signal generation. To demonstrate this point, two 40 mm-long amorphous metal magnetic strips of METGLAS®2714A, which generated about 22 mV of the 25$^{th}$ harmonic signal each, as given in Table I, were placed in parallel to keep the magnetic volume close to or slightly larger than that of a 75 mm long strip, and the harmonic signals were measured. The 25$^{th}$ harmonic signal from the two 40 mm long strips was 31 mV, which was about the same level as the 28 mV obtained for a single 40 mm long strip, and was much smaller than the 520 mV from a single 75 mm-long strip, showing that two shorter strips placed in parallel with the same magnetic volume as one longer strip do not generate the same level of harmonic signals. This remarkable difference was utilized in embodiments of the present invention as demonstrated below.

Figure 2:
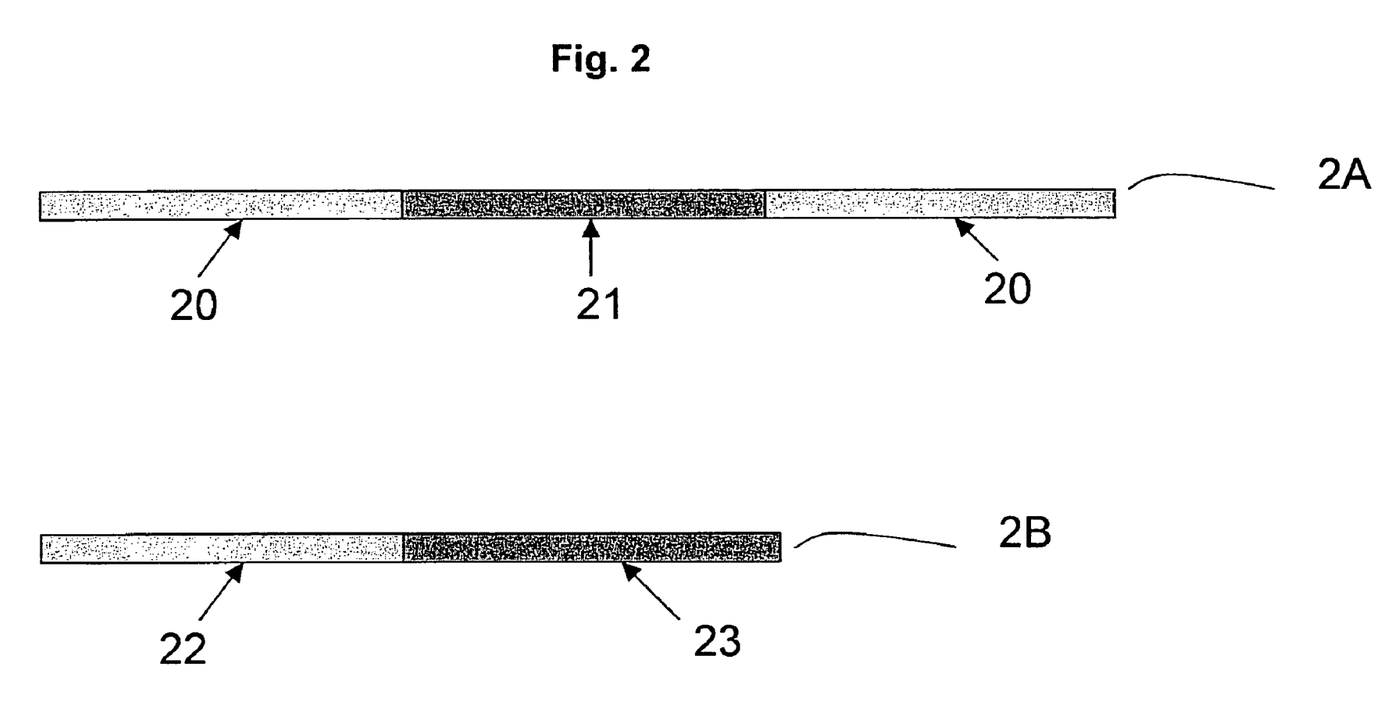
FIG. 2 is a schematic representation showing two basic arrangements, 2A and 2B, for the sensor strips of embodiments of the present invention.

The two amorphous metal magnetic strips 20 with lengths of 40 mm for an embodiment of the present invention prepared from METGLAS®2705M or METGLAS®2714A ribbon of Table I were connected with another amorphous metal magnetic strip 21 having a lower Curie temperature, such as AM1 through AM4 listed in Table I, than that of the 40 mm-long strips, as shown in FIG. 2. Higher harmonic signals generated from this temperature sensor configuration and embodiment of the present invention were measured by using the method of Example 3. Table II summarizes the 25$^{th}$ harmonic signals generated from each three-strip temperature sensors.

TABLE II

Harmonic signals at room temperature from three-strip temperature
sensors for embodiments of the present invention with 40 mm-long
center connecting strip materials 21 of FIG. 2 made from
different alloys listed in Table I

| | 25$^{th}$ Harmonic Signal (mV) | |
|---|---|---|
| ALLOY | METGLAS ® 2714A | METGLAS ® 2705M |
| AM1 | 830 | 210 |
| AM2 | 740 | 200 |
| AM3 | 480 | 170 |
| AM4 | 540 | 385 |

Figure 3:
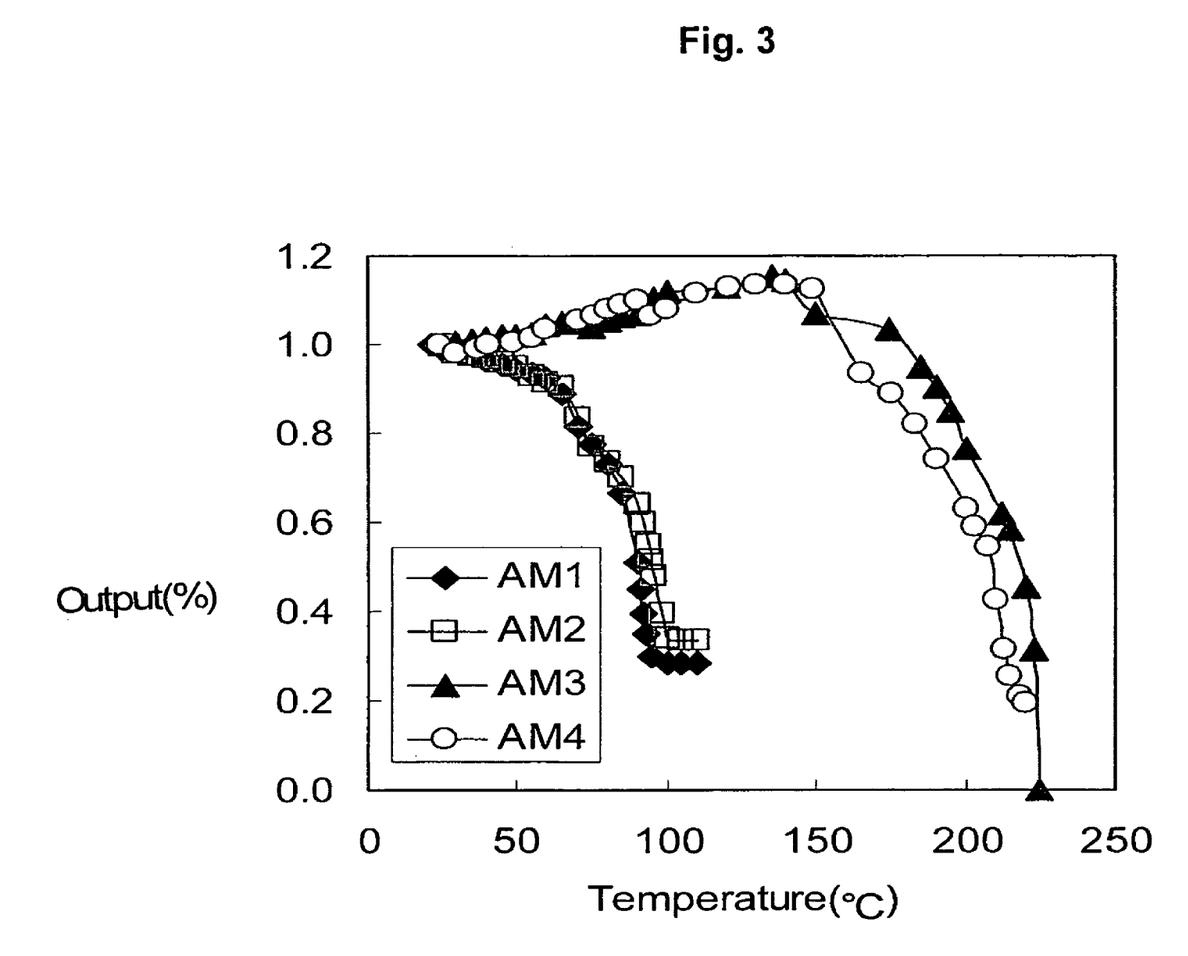
FIG. 3 is a graphical representation, depicting the temperature dependence of a three-strip sensor 2A of embodiments of the present invention of FIG. 2, in which the sensor strip elements 20 are based on METGLAS®2714A.
Figure 4:
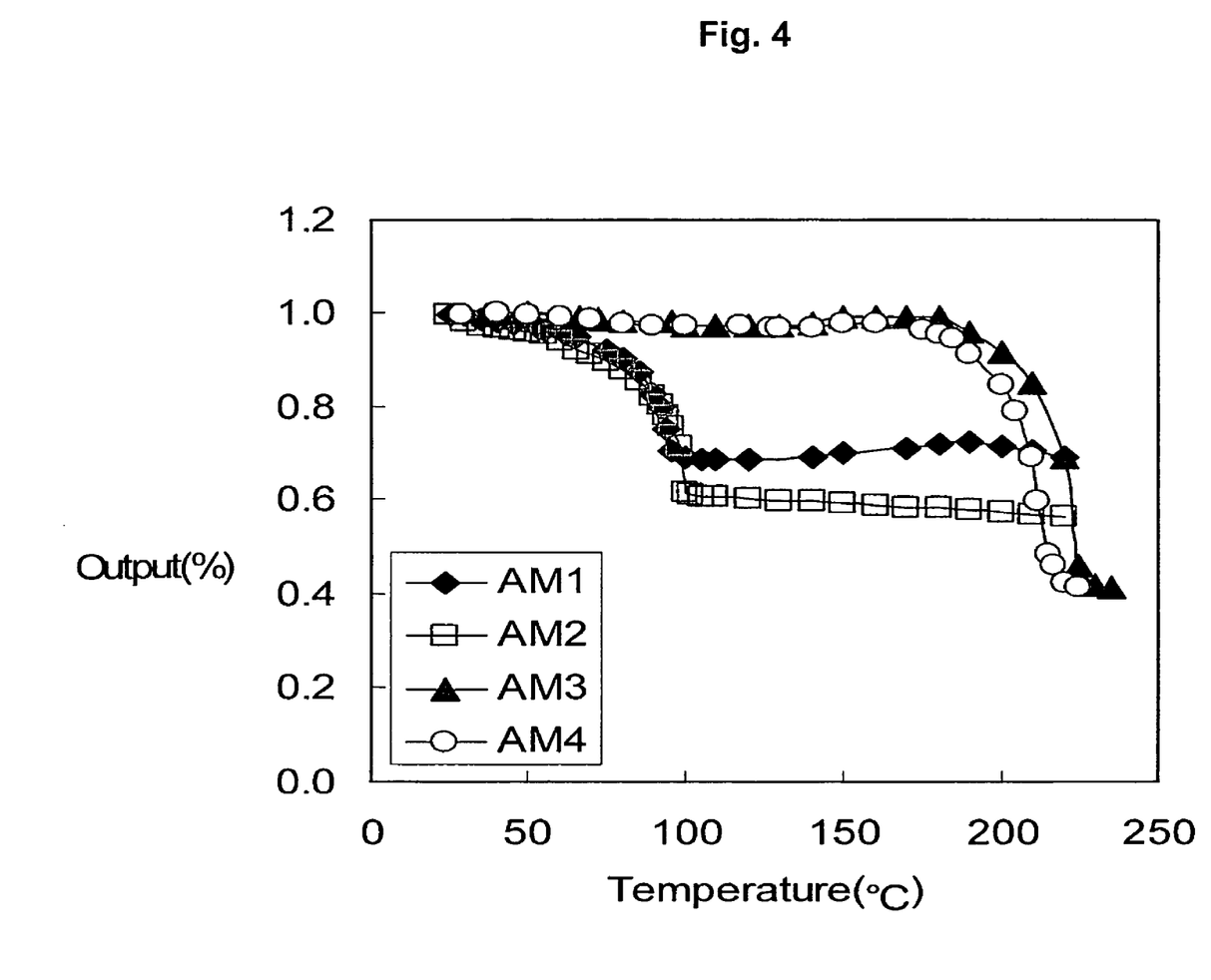
FIG. 4 is a graphical representation, depicting the temperature dependence of a three-strip sensor 2A of embodiments of the present invention of FIG. 2, in which the sensor strip elements 20 are based on METGLAS®2705M.

The temperature dependence of the harmonic signal was measured by the method described in Example 3, and the results are shown in FIG. 3, in which the two major harmonics generating strips 20 of FIG. 2 were based on METGLAS®2714A ribbon with METGLAS®2714A ribbon with $\theta_f$=230° C. and in FIG. 4, in which the harmonics generating strips 20 of FIG. 2 were based on METGLAS®2705M ribbon with $\theta_f$=350° C. The vertical scales of FIGS. 3 and 4 are in percentage changes so that direct comparison among different temperature sensors of embodiments of the present invention may be made. As depicted in FIGS. 3 and 4, temperature sensors of embodiments of the present invention show large changes in the harmonic signal generation at the Curie temperatures of the temperature sensitive amorphous metal strips chosen. Thus, the temperature of an environment in which a temperature sensor for embodiments of the present invention is placeable is determined as the same as or close to the Curie temperature of the temperature sensitive strip element 21 in the sensor configuration 2A of FIG. 2.

Figure 5:
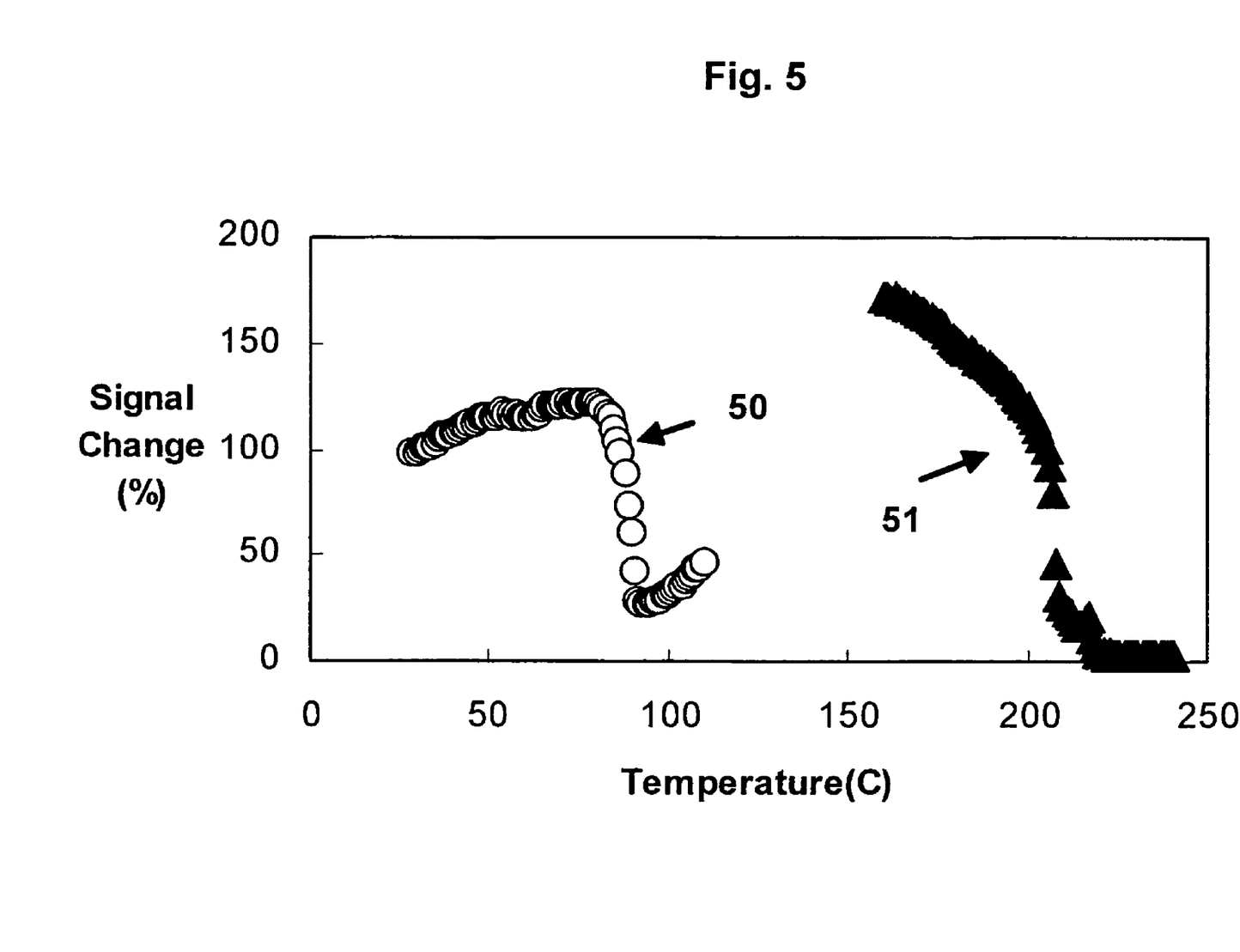
FIG. 5 is a graphical representation, depicting the temperature dependence of a two-strip sensor 2B of embodiments of the present invention of FIG. 2, in which the sensor strip element 22 is cut from METGLAS®2714A ribbon and the temperature sensing strip element 23 is cut from AM2, shown by Curve 50, and from AM3, shown by Curve 51.

Another similar example is also shown in FIG. 2, in which an amorphous magnetic metal strip 22 selected from either one of METGLAS®2714A or METGLAS®2705M ribbon listed in Table I was connected to another amorphous magnetic metal strip 23 cut from any one of AM1~AM4 alloy ribbon listed in Table I having a lower Curie temperature than that of the strip 22. Higher harmonic signals generated from this temperature sensor configuration and embodiments of the present invention were also measured by using the method of Example 3. Examples of the temperature dependence of the harmonic signals from two sensors, each with one temperature sensitive 40 mm-long strip 23, the two sensors having different Curie temperatures and the other harmonic generating 40 mm-long strip 22 are shown in FIG. 5. The width of each strip was about 2 mm. For the two cases in FIG. 5, in the first case, the harmonic signal generating strip 22 was cut from METGLAS®2714A ribbon and the temperature sensing strip 23 was cut from AM1 alloy ribbon of Table I, which is shown by Curve 50, and in the second case, the harmonic signal generating strip 22 was cut from METGLAS®2714A ribbon and the temperature sensing strip 23 was cut from AM3 alloy ribbon of Table I, which is shown by Curve 51. It is noted that a large reduction of the harmonic signal was observed at the Curie temperature, $\theta_f$=93° C. for AM1 and $\theta_f$=222° C. for AM3, of the temperature sensitive strip element corresponding to the element 23 of FIG. 2 in both cases, as is clearly shown in FIG. 5. Thus, the temperature of an environment in which a temperature sensor of embodiments of the present invention is placeable is determined as the same as, or close to, the Curie temperature of the particular temperature sensitive strip chosen for strip element 23 in the sensor configuration 2B of FIG. 2.

The Curie temperatures, ranging from 90° C. to 220° C., of the temperature-sensitive amorphous magnetic metal strips adopted in the temperature sensors depicted in FIGS. 1~5 and Table I and II were chosen for the purpose of providing examples and without loss of generality. Since the Curie temperature of an amorphous magnetic alloy may be continuously changed by changing the alloy chemistry, any choice for the Curie temperature, and hence, the predetermined temperature to be detected, may be utilized in a temperature sensor of embodiments of the present invention. The only requirement is that the Curie temperature of a temperature-sensitive strip element be lower than that of the main harmonic signal generating strip element. Examples of the amorphous magnetic alloys for a temperature-sensitive strip element of embodiments of the present invention are listed with their Curie temperatures in Table III. The preferred amorphous magnetic alloys for a temperature-sensitive strip element according to embodiments of the present invention thus have a composition defined essentially by the formula $Fe_a\ M_b\ B_c\ Si_d\ C_e$, wherein $61<a<81$, $0<b<15$, $2\leq c<25$, $0<d<7$ and $0<e\leq18$ and $a+b+c+d+e=100$, the numbers being in atom percent, with the proviso that up to 50% of Fe content may be replaced by Ni, and M being selected from Cr, Mo, Nb, Ti and W. The alloys AM1, AM2, AM3 and AM4 in Table I correspond to Alloy 21, 20, 12 and 13, respectively in Table III.

TABLE III

Amorphous magnetic alloys for temperature-sensitive strip element of embodiments of the present invention

| Alloy | Composition | Curie Temperature, $\theta_f$ (° C.) |
|---|---|---|
| 1 | $Fe_{77}Cr_2B_{17}Si_4$ | 344 |
| 2 | $Fe_{80}Cr_1B_{17}Si_2$ | 341 |
| 3 | $Fe_{76}Mo_3B_{17}Si_4$ | 318 |
| 4 | $Fe_{76}Cr_3B_{17}Si_4$ | 313 |
| 5 | $Fe_{79}Cr_2B_{17}Si_2$ | 309 |
| 6 | $Fe_{79}Mo_2B_{17}Si_2$ | 300 |
| 7 | $Fe_{78}Cr_3B_{17}Si_2$ | 283 |
| 8 | $Fe_{75}Ti_5B_{20}$ | 273 |
| 9 | $Fe_{78}Mo_3B_{17}Si_2$ | 256 |
| 10 | $Fe_{40}Ni_{34}Mo_6B_{20}$ | 241 |
| 11 | $Fe_{75}W_5B_{20}$ | 224 |
| 12 | $Fe_{67}Mo_7B_{20}Si_6$ | 222 |
| 13 | $Fe_{71}Mo_6B_{20}Si_3$ | 213 |
| 14 | $Fe_{74}Mo_6C_{18}B_2$ | 212 |
| 15 | $Fe_{75}Nb_5B_{20}$ | 209 |
| 16 | $Fe_{74}Mo_6B_{20}$ | 183 |
| 17 | $Fe_{72}Mo_8C_{18}B_2$ | 143 |
| 18 | $Fe_{70}Mo_{10}C_{18}B_2$ | 123 |
| 19 | $Fe_{72}Mo_8B_{20}$ | 122 |
| 20 | $Fe_{66.5}Cr_{13}B_{16}Si_{2.5}$ | 99 |
| 21 | $Fe_{62}Cr_{14}B_{18}Si_6$ | 93 |
| 22 | $Fe_{68}Mo_{12}C_{18}B_2$ | 62 |

For a harmonic signal generating strip of embodiments of the present invention, commercially available amorphous near-zero magnetostrictive alloy ribbon such as METGLAS®2705M and METGLAS®2714A material is suitable, as shown in Table I. In addition, any amorphous magnetic alloy ribbon with a square or rectangular BH hysteresis behavior with a low coercivity, as exemplified in FIG. 1, is usable as the harmonic signal generating element of a temperature sensor for embodiments of the present invention. Examples of the amorphous alloys suitable for generating high harmonic signals are listed in Table IV. The amorphous magnetic alloys suitable for a harmonic generating strip element of embodiments of the present invention thus have a composition defined essentially by the formula $Fe_aNi_bCo_cM_eB_fSi_gC_h$, where $3<a<80$; $0<b<41$; $0<c<72$; $0<e<4$, with M selected from Cr, Mo, and Mn; $1<f<20$; $0<g<16$; $0<h<4$; and $a+b+c+e+f+g+h=100$. Another requirement for a harmonic signal generating strip element of embodiments of the present invention is that the Curie temperature of said element be higher than that of a temperature-sensitive strip element chosen from Table III. The amorphous alloys possessing the features of low coercivities and high squareness ratios exhibit high magnetic permeabilities well exceeding 2,000. For example, an amorphous $Fe_{80}B_{10}Si_{10}$ alloy listed in Table IV showed a permeability measured by a conventional method of about 7,000, which is a lowest among all alloys listed.

TABLE IV

Examples of a harmonic generating sensor strip of the present invention

| Alloy | Curie Temperature, $\theta_f$ (° C.) |
|---|---|
| $Fe_{80}B_{10}Si_{10}$ | 395 |
| $Fe_{78}Ni_{12}Mo_2B_{16}Si_2$ | 379 |
| $Fe_{75}Ni_4Mo_3B_{16}Si_2$ | 295 |
| $Co_{70.5}Fe_{4.5}B_{15}Si_{10}$ | 422 |
| $Co_{68.2}Fe_{3.8}Mn_1B_{12}Si_{15}$ | 266 |
| $Co_{67.8}Fe_{4.2}Mo_1B_{12}Si_{15}$ | 227 |
| $Co_{36}Ni_{35}Fe_8Mo_1B_{18}Si_2$ | 329 |
| $Co_{36}Ni_{35}Fe_8Mo_1B_{10}Si_{10}$ | 305 |
| $Ni_{35}Co_{35}Fe_{10}B_{18}Si_2$ | 285 |
| $Ni_{40}Co_{30}Fe_9Mo_1B_{18}Si_2$ | 280 |
| $Ni_{40}Co_{30}Fe_{10}B_{14.5}Si_2C_{3.5}$ | 269 |
| $Ni_{40}Co_{30}Fe_9Mo_1B_{14}Si_6$ | 240 |
| $Ni_{38}Co_{30}Fe_{10}Mo_2B_{14}Si_6$ | 215 |
| $Ni_{38}Co_{30}Fe_{10}Mo_2B_{15}Si_2C_3$ | 205 |
| $Ni_{40}Co_{30}Fe_9Mo_1B_6Si_{14}$ | 200 |
| $Ni_{38}Co_{30}Fe_{10}Mo_2B_{10}Si_{10}$ | 195 |
| $Ni_{40}Co_{30}Fe_8Mo_2B_{18}Si_2$ | 168 |
| $Ni_{38}Co_{30}Fe_{10}Mo_2B_6Si_{14}$ | 155 |

The Curie temperature of the amorphous alloys listed in Table IV varies from 155 to 422° C., allowing an alloy with a lower $\theta_f$ to be utilized as a temperature-sensitive strip element and allowing an alloy with a higher $\theta_f$ to be utilized as a harmonic generating strip element for embodiments of the present invention.

EXAMPLE 1

Sample Preparation

Amorphous magnetic alloys used in embodiments of the present invention were prepared by the metal casting method described in U.S. Pat. No. 4,142,571. The cast material was in ribbon form, with a thickness around 20 μm and a width ranging from about 25 mm to 213 mm.

A cast ribbon then was slit to a narrower ribbon with a width ranging from about 0.5 mm to 10 mm. If necessary, a slit ribbon was heat-treated to change its magnetic properties. A ribbon thus prepared was cut into pieces with variable lengths.

EXAMPLE 2

Commercially available dc BH loop measurement equipment was utilized to measure magnetic induction B as a function of applied field H. FIG. 1 was obtained by using this equipment.

EXAMPLE 3

A temperature sensor strip element in accordance with Example 1 was placed in an exciting AC field at a predetermined fundamental frequency, and its higher harmonics response was detected by a coil containing the strip element. The exciting coil and signal detecting coil were wound on a bobbin with a diameter of about 50 mm. The number of windings in the exciting coil and the signal detecting coil was about 180 and about 250, respectively. Inside the 50 mm-diameter bobbin, a non-magnetic tube was inserted, in which a sample heating element was placed by which the strip sample temperature was varied. The temperature of the strip element was determined by attaching a thermocouple directly on one end of the strip element. The fundamental exciting AC field was chosen at 2.4 kHz, and its voltage at the exciting coil was about 80 mV. The $25^{th}$ harmonic voltages from the signal detecting coil were measured by a commercially available digital voltmeter.

Figure 6:
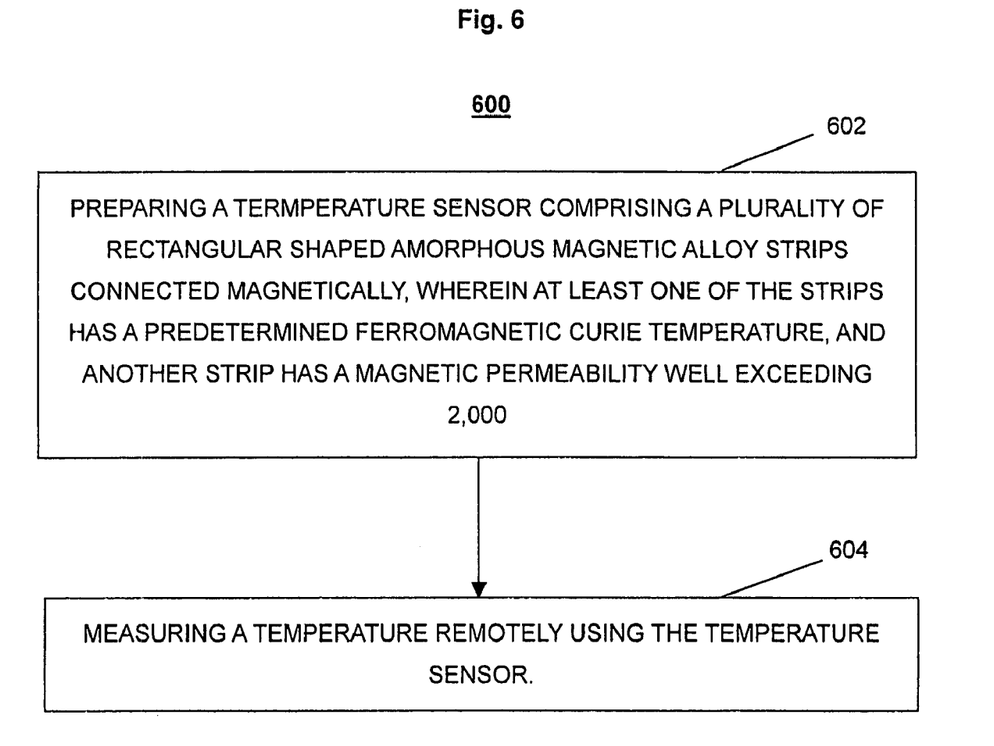
FIG. 6 is a flowchart illustrating operations of a method to provide remote temperature sensing using a temperature sensor in accordance with an embodiment of the present invention.

FIG. 6 illustrates operations of a method to provide remote temperature sensing using a temperature sensor in accordance with an embodiment of the present invention. In one embodiment of the present invention, the method 600 provides remote temperature sensing comprising: preparing at 602 a temperature sensor comprising a plurality of rectangular shaped amorphous magnetic alloy strips connected magnetically, wherein at least one of the strips has a predetermined ferromagnetic Curie temperature, and another strip has a magnetic permeability well exceeding 2,000; and measuring at 604 a temperature remotely using the temperature sensor.

In an embodiment of the present invention, the method further includes that the magnetic permeability of the another strip is greater than 6000.

In another embodiment of the present invention, the method further includes that the at least one of the plurality of the rectangular shaped amorphous magnetic alloy strips with the predetermined ferromagnetic Curie temperature has a composition defined essentially by the formula $Fe_a M_b B_c Si_d C_e$, wherein $61<a<81$, $0<b<15$, $2\leq c<25$, $0<d<10$ and $0<e\leq 18$ and $a+b+c+d+e=100$, numbers being in atom percent, up to 50% of Fe content being replaced by Ni and M being selected from Cr, Mo, Nb, Ti, and W.

In an embodiment of the present invention, the method further includes that the another strip of the plurality of rectangular shaped amorphous magnetic alloy strips has a magnetic permeability well exceeding 2,000 and a composition defined essentially by the formula $Fe_a Ni_b Co_c M_e B_f Si_g C_h$ wherein $3<a<80$, $0<b<41$, $0<c<72$, $0<e<4$, with M selected from Cr, Mo, and Mn, $1<f<20$, $0<g<16$ and $0<h<4$, and $a+b+c+e+f+g+h=100$, numbers being in atom percent.

In another embodiment of the present invention, the method further includes that one amorphous magnetic alloy strip has the predetermined ferromagnetic Curie temperature and a composition defined essentially by the formula $Fe_a M_b B_c Si_d C_e$, wherein $61<a<81$, $0<b<15$, $2\leq c<25$, $0<d<10$ and $0<e\leq 18$ and $a+b+c+d+e=100$, numbers being in atom percent, up to 50% of Fe content being replaced by Ni and M being selected from Cr, Mo, Nb, Ti, and W and another amorphous magnetic alloy strip has a magnetic permeability well exceeding 2,000, and a composition defined essentially by the formula $Fe_a Ni_b Co_c M_e B_f Si_g C_h$ wherein $3<a<80$, $0<b<41$, $0<c<72$, $0<e<4$, with M selected from Cr, Mo, and Mn, $1<f<20$, $0<g<16$ and $0<h<4$, and $a+b+c+e+f+g+h=100$, numbers being in atom percent.

In an embodiment of the present invention, the method further includes that the temperature sensor has two amorphous magnetic alloy strips with two different compositions having a magnetic permeability well exceeding 2,000, and a composition defined essentially by the formula $Fe_a Ni_b Co_c M_e B_f Si_g C_h$ wherein $3<a<80$, $0<b<41$, $0<c<72$, $0<e<4$, with M selected from Cr, Mo, and Mn, $1<f<20$, $0<g<16$ and $0<h<4$, and $a+b+c+e+f+g+h=100$, numbers being in atom percent.

In another embodiment of the present invention, the method further includes that the temperature sensor has one amorphous magnetic alloy strip with the predetermined ferromagnetic Curie temperature and a composition defined essentially by the formula $Fe_a M_b B_c Si_d C_e$, wherein $61<a<81$, $0<b<15$, $2\leq c<25$, $0<d<10$ and $0<e\leq 18$ and $a+b+c+d+e=100$, numbers being in atom percent, up to 50% of Fe content being replaced by Ni and M being selected from Cr, Mo, Nb, Ti, and W and two amorphous magnetic alloy strips with a same chemical composition of having a magnetic permeability well exceeding 2,000, and a composition defined essentially by the formula $Fe_a Ni_b Co_c M_e B_f Si_g C_h$ wherein $3<a<80$, $0<b<41$, $0<c<72$, $0<e<4$, with M selected from Cr, Mo, and Mn, $1<f<20$, $0<g<16$ and $0<h<4$, and $a+b+c+e+f+g+h=100$, numbers being in atom percent.

In an embodiment of the present invention, the method further includes that the temperature sensor has at least one amorphous magnetic alloy strip, the at least one strip has a magnetic permeability well exceeding 2,000 and a composition defined essentially by the formula $Fe_a Ni_b Co_c M_e B_f Si_g C_h$ wherein $3<a<80$, $0<b<41$, $0<c<72$, $0<e<4$, with M selected from Cr, Mo, and Mn, $1<f<20$, $0<g<16$ and $0<h<4$, and $a+b+c+e+f+g+h=100$, numbers being in atom percent, and a plurality of amorphous magnetic alloy strips with different chemical compositions selected from a composition with the predetermined ferromagnetic Curie temperature has a composition defined essentially by the formula $Fe_a M_b B_c Si_d C_e$, wherein $61<a<81$, $0<b<15$, $2\leq c<25$, $0<d<10$ and $0<e\leq 18$ and $a+b+c+d+e=100$, numbers being in atom percent, up to 50% of Fe content being replaced by Ni and M being selected from Cr, Mo, Nb, Ti, and W and a composition having a magnetic permeability well exceeding 2,000, and a composition defined essentially by the formula $Fe_a Ni_b Co_c M_e B_f Si_g C_h$ wherein $3<a<80$, $0<b<41$, $0<c<72$, $0<e<4$, with M selected from Cr, Mo, and Mn, $1<f<20$, $0<g<16$ and $0<h<4$, and $a+b+c+e+f+g+h=100$, numbers being in atom percent.

In another embodiment of the present invention, the method further includes utilizing the temperature sensor in a remote temperature sensing device by interrogating the temperature sensor by a magnetic field, and detecting said temperature sensor's response signal electromagnetically.

In an embodiment of the present invention, the method to remotely sense temperature comprises utilizing at least one coil emanating an interrogating magnetic field and at least one coil detecting a response signal of a temperature sensor, wherein the temperature sensor comprises a plurality of rectangular shaped amorphous magnetic alloy strips connected magnetically, and wherein at least one of the strips has a predetermined ferromagnetic Curie temperature, and another strip has a magnetic permeability well exceeding 2,000.

Although a few embodiments and examples of the present invention have been shown and described, it would be appreciated by those skilled in the art that changes may be made in these embodiments without departing from the principles and spirit of the invention, the scope of which is defined in the claims and their equivalents.

What is claimed is:
1. A temperature sensor, comprising:
a plurality of rectangular-shaped amorphous magnetic alloy strips connected in series magnetically, wherein at least one of the amorphous magnetic alloy strips has a predetermined ferromagnetic Curie temperature, and another amorphous magnetic alloy strip has a magnetic permeability well exceeding 2,000, wherein said tem- perature sensor is interrogatable by a magnetic field, and said temperature sensor's response signal is detectable electromagnetically.

2. The temperature sensor of claim 1, wherein the magnetic permeability of the another strip is greater than 6000.

3. The temperature sensor of claim 1, wherein the at least one of the plurality of rectangular shaped amorphous magnetic alloy strips with the predetermined ferromagnetic Curie temperature has a composition defined essentially by the formula $Fe_a M_b B_c Si_d C_e$, wherein $61<a<81$, $0<b<15$, $2\leq c<25$, $0<d<10$ and $0<e\leq18$ and $a+b+c+d+e=100$, numbers being in atom percent, up to 50% of Fe content being replaced by Ni and M being selected from Cr, Mo, Nb, Ti, and W.

4. The temperature sensor of claim 1, wherein the another strip of the plurality of rectangular shaped amorphous magnetic alloy strips has a magnetic permeability well exceeding 2,000, and a composition defined essentially by the formula $Fe_a Ni_b Co_c M_e B_f Si_g C_h$ wherein $3<a<80$, $0<b<41$, $0<c<72$, $0<e<4$, with M selected from Cr, Mo, and Mn, $1<f<20$, $0<g<16$ and $0<h<4$, and $a+b+c+e+f+g+h=100$, numbers being in atom percent.

5. The temperature sensor of claim 1, wherein:
the at least one of the strips has the predetermined ferromagnetic Curie temperature and has a composition defined essentially by the formula $Fe_a M_b B_c Si_d C_e$, wherein $61<a<81$, $0<b<15$, $2\leq c<25$, $0<d<10$ and $0<e\leq18$ and $a+b+c+d+e=100$, numbers being in atom percent, up to 50% of Fe content being replaced by Ni and M being selected from Cr, Mo, Nb, Ti, and W; and
the another strip has a magnetic permeability well exceeding 2,000 and has a composition defined essentially by the formula $Fe_a Ni_b Co_c M_e B_f Si_g C_h$ wherein $3<a<80$, $0<b<41$, $0<c<72$, $0<e<4$, with M selected from Cr, Mo, and Mn, $1<f<20$, $0<g<16$ and $0<h<4$, and $a+b+c+e+f+g+h=100$, numbers being in atom percent.

6. The temperature sensor of claim 1, wherein: each of the at least one of the strips and the another strip has a magnetic permeability well exceeding 2,000 and the compositions of the at least one of the strips and the another strip are defined essentially by the formula $Fe_a Ni_b Co_c M_e B_f Si_g C_h$ wherein $3<a<80$, $0<b<41$, $0<c<72$, $0<e<4$, with M selected from Cr, Mo, and Mn, $1<f<20$, $0<g<16$ and $0<h<4$, and $a+b+c+e+f+g+h=100$, numbers being in atom percent.

7. The temperature sensor of claim 1, wherein:
the at least one of the strips with the predetermined ferromagnetic Curie temperature has a composition defined essentially by the formula $Fe_a M_b B_c Si_d C_e$, wherein $61<a<81$, $0<b<15$, $2\leq c<25$, $0<d<10$ and $0<e\leq18$ and $a+b+c+d+e=100$, numbers being in atom percent, up to 50% of Fe content being replaced by Ni and M being selected from Cr, Mo, Nb, Ti, and W ; and
said strip is flanked by another two strips having at least a magnetic permeability well exceeding 2,000 and a same chemical composition defined essentially by the formula $Fe_a Ni_b Co_c M_e B_f Si_g C_h$ wherein $3<a<80$, $0<b<41$, $0<c<72$, $0<e<4$, with M selected from Cr, Mo, and Mn, $1<f<20$, $0<g<16$ and $0<h<4$, and $a+b+c+e+f+g+h=100$, numbers being in atom percent.

8. The temperature sensor of claim 1, wherein:
the at least one strip has a magnetic permeability well exceeding 2,000 and a composition defined essentially by the formula $Fe_a Ni_b Co_c M_e B_f Si_g C_h$ wherein $3<a<80$, $0<b<41$, $0<c<72$, $0<e<4$, with M selected from Cr, Mo, and Mn, $1<f<20$, $0<g<16$ and $0<h<4$, and $a+b+c+e+f+g+h=100$, numbers being in atom percent, and the another strip is selected from a plurality of amorphous magnetic alloy strips with different chemical compositions comprising:
a composition with the predetermined ferromagnetic Curie temperature and having a composition defined essentially by the formula $Fe_a M_b B_c Si_d C_e$, wherein $61<a<81$, $0<b<15$, $2\leq c<25$, $0<d<10$ and $0<e\leq18$ and $a+b+c+d+e=100$, numbers being in atom percent, up to 50% of Fe content being replaced by Ni and M being selected from Cr, Mo, Nb, Ti, and W, and
a composition having a magnetic permeability well exceeding 2,000, and having a composition defined essentially by the formula $Fe_a Ni_b Co_c M_e B_f Si_g C_h$ wherein $3<a<80$, $0<b<41$, $0<c<72$, $0<e<4$, with M selected from Cr, Mo, and Mn, $1<f<20$, $0<g<16$ and $0<h<4$, and $a+b+c+e+f+g+h=100$, numbers being in atom percent.

9. The temperature sensor of claim 1, wherein said temperature sensor is interrogatable by an AC magnetic field.

10. A temperature sensor for a remote temperature sensing device, the temperature sensor comprising:
a plurality of rectangular-shaped amorphous magnetic alloy strips connected in series magnetically, wherein at least one of the amorphous magnetic alloy strips has a predetermined ferromagnetic Curie temperature, and another amorphous magnetic alloy strip has a magnetic permeability well exceeding 2,000; and
a response signal of the temperature sensor being detectable by the temperature sensing device having at least one coil emanating an interrogating magnetic field, and at least one coil detecting a response signal of the temperature sensor.

11. A method to provide remote temperature sensing, comprising:
utilizing a temperature sensor comprising a plurality of rectangular shaped amorphous magnetic alloy strips connected in series magnetically, at least one of the amorphous magnetic alloy strips has a predetermined ferromagnetic Curie temperature, and another amorphous magnetic alloy strip has a magnetic permeability well exceeding 2,000 to measure a temperature remotely: and
utilizing the temperature sensor in a remote temperature sensing device by interrogating the temperature sensor by a magnetic field, and detecting said temperature sensor's response signal electromagnetically.

12. The method of claim 11, wherein the magnetic permeability of the another strip is greater than 6000.

13. The method of claim 11, wherein the at least one of the plurality of rectangular shaped amorphous magnetic alloy strips with the predetermined ferromagnetic Curie temperature has a composition defined essentially by the formula $Fe_a M_b B_c Si_d C_e$, wherein $61<a<81$, $0<b<15$, $2\leq c<25$, $0<d<10$ and $0<e\leq18$ and $a+b+c+d+e=100$, numbers being in atom percent, up to 50% of Fe content being replaced by Ni and M being selected from Cr, Mo, Nb, Ti, and W.

14. The method of claim 11, wherein the another strip of the plurality of rectangular shaped amorphous magnetic alloy strips has a magnetic permeability well exceeding 2,000 and a composition defined essentially by the formula $Fe_a Ni_b Co_c M_e B_f Si_g C_h$ wherein $3<a<80$, $0<b<41$, $0<c<72$, $0<e<4$, with M selected from Cr, Mo, and Mn, $1<f <20$, $0<g<16$ and $0<h<4$, and $a+b+c+e+f+g+h=100$, numbers being in atom percent.

15. The method of claim 11, wherein:
the at least one of the strips has the predetermined ferromagnetic Curie temperature and a composition defined essentially by the formula $Fe_a M_b B_c Si_d C_e$, wherein $61<a<81$, $0<b<15$, $2\leq c<25$, $0<d<10$ and $0<e\leq 18$ and $a+b+c+d+e=100$, numbers being in atom percent, up to 50% of Fe content being replaced by Ni and M being selected from Cr, Mo, Nb, Ti, and W; and the another strip has a magnetic permeability well exceeding 2,000, and a composition defined essentially by the formula $Fe_a Ni_b Co_c M_e B_f Si_g C_h$ wherein $3<a<80$, $0<b<41$, $0<c<72$, $0<e<4$, with M selected from Cr, Mo, and Mn, $1<f<20$, $0<g<16$ and $0<h<4$, and $a+b+c+e+f+g+h=100$, numbers being in atom percent.

16. The method of claim 11, wherein the temperature sensor includes two amorphous magnetic alloy strips with two different compositions having a magnetic permeability well exceeding 2,000, and a composition defined essentially by the formula $Fe_a Ni_b Co_c M_e B_f Si_g C_h$ wherein $3<a<80$, $0<b<41$, $0<c<72$, $0<e<4$, with M selected from Cr, Mo, and Mn, $1<f<20$, $0<g<16$ and $0<h<4$, and $a+b+c+e+f+g+h=100$, numbers being in atom percent.

17. The method of claim 11, wherein:

the at least one of the strips comprises an amorphous magnetic alloy strip with the predetermined ferromagnetic Curie temperature and a composition defined essentially by the formula $Fe_a M_b B_c Si_d C_e$, wherein $61<a<81$, $0<b<15$, $2\leq c<25$, $0<d<10$ and $0<e\leq 18$ and $a+b+c+d+e=100$, numbers being in atom percent, up to 50% of Fe content being replaced by Ni and M being selected from Cr, Mo, Nb, Ti, and W; and the another strip has a magnetic permeability well exceeding 2,000 and a same chemical composition defined essentially by the formula $Fe_a Ni_b Co_c M_e B_f Si_g C_h$ wherein $3<a<80$, $0<b<41$, $0<c<72$, $0<e<4$, with M selected from Cr, Mo, and Mn, $1<f<20$, $0<g<16$ and $0<h<4$, and $a+b+c+e+f+g+h=100$, numbers being in atom percent.

18. The method of claim 11, wherein:

the at least one strip comprises an amorphous magnetic alloy strip having a magnetic permeability well exceeding 2,000 and a composition defined essentially by the formula $Fe_a Ni_b Co_c M_e B_f Si_g C_h$ wherein $3<a<80$, $0<b<41$, $0<c<72$, $0<e<4$, with M selected from Cr, Mo, and Mn, $1<f<20$, $0<g<16$ and $0<h<4$, and $a+b+c+e+f+g+h=100$, numbers being in atom percent; and the another strip is one or more strips selected from a plurality of amorphous magnetic alloy strips with different chemical compositions selected from:

a composition having a predetermined ferromagnetic Curie temperature and a composition defined essentially by the formula $Fe_a M_b B_c Si_d C_e$, wherein $61<a<81$, $0<b<15$, $2\leq c<25$, $0<d<10$ and $0<e\leq 18$ and $a+b+c+d+e=100$, numbers being in atom percent, up to 50% of Fe content being replaced by Ni and M being selected from Cr, Mo, Nb, Ti, and W, and a composition having a magnetic permeability well exceeding 2,000 and defined essentially by the formula $Fe_a Ni_b Co_c M_e B_f Si_g C_h$ wherein $3<a<80$, $0<b<41$, $0<c<72$, $0<e<4$, with M selected from Cr, Mo, and Mn, $1<f<20$, $0<g<16$ and $0<h<4$, and $a+b+c+e+f+g+h=100$, numbers being in atom percent.

19. The method of claim 11, further comprising interrogating the temperature sensor with an AC magnetic field.

20. A method to remotely sense temperature, comprising:

utilizing a remote temperature sensing device having a temperature sensor, at least one coil emanating an interrogating magnetic field, and at least one coil detecting a response signal of the temperature sensor, wherein the temperature sensor comprises a plurality of rectangular-shaped amorphous magnetic alloy strips connected in series magnetically, and wherein at least one of the amorphous magnetic alloy strips has a predetermined ferromagnetic Curie temperature, and another amorphous magnetic alloy strip has a magnetic permeability well exceeding 2,000.

* * * * *

UNITED STATES PATENT AND TRADEMARK OFFICE
CERTIFICATE OF CORRECTION

| | | |
|---|---|---|
| PATENT NO. | : 7,931,400 B2 | Page 1 of 1 |
| APPLICATION NO. | : 11/712444 | |
| DATED | : April 26, 2011 | |
| INVENTOR(S) | : Ryusuke Hasegawa et al. | |

It is certified that error appears in the above-identified patent and that said Letters Patent is hereby corrected as shown below:

Column 11, Line 53, In Claim 7, delete "W ;" and insert --W;--, therefor.

Column 12, Line 31, In Claim 10, delete "a" and insert --the--, therefor.

Column 12, Line 42, In Claim 11, delete "remotely:" and insert --remotely;--, therefor.

Column 14, Line 7, In Claim 18, delete "0<h<4,and" and insert --0<h<4, and--, therefor.

Signed and Sealed this
Fourteenth Day of August, 2012

David J. Kappos
*Director of the United States Patent and Trademark Office*